United States Patent [19]
Tang et al.

[11] Patent Number: 5,998,534
[45] Date of Patent: Dec. 7, 1999

[54] WATER-SOLUBLE OR WATER-DISPERSIBLE ADDITION COPOLYMER

[75] Inventors: Robert H. Tang, Murrysville; Huawen Li, Delmont, both of Pa.; Alan E. Wang, Hoffman Estates, Ill.

[73] Assignee: PPG Industries Ohio, Inc., Cleveland, Ohio

[21] Appl. No.: 09/100,517

[22] Filed: Jun. 19, 1998

[51] Int. Cl.$^6$ .................................................. C08F 26/06
[52] U.S. Cl. ............................................ 524/548; 526/258
[58] Field of Search .................................. 524/555, 548; 526/258

[56] References Cited

U.S. PATENT DOCUMENTS

| | | | |
|---|---|---|---|
| 4,571,382 | 2/1986 | Adachi | 435/7 |
| 4,649,174 | 3/1987 | Akiyama et al. | 524/841 |
| 4,935,333 | 6/1990 | Kimoto et al. | 430/285 |
| 5,009,982 | 4/1991 | Kamayachi et al. | 430/280 |
| 5,100,763 | 3/1992 | Kimoto et al. | 430/285 |
| 5,412,019 | 5/1995 | Roulstone et al. | 524/497 |
| 5,529,914 | 6/1996 | Hubbell et al. | 435/182 |
| 5,534,585 | 7/1996 | Roulstone et al. | 524/497 |
| 5,674,561 | 10/1997 | Dietz et al. | 427/208.4 |
| 5,910,551 | 6/1999 | Bowen | 526/238.2 |

FOREIGN PATENT DOCUMENTS

| | | |
|---|---|---|
| 2207893 | 12/1997 | Canada . |
| WO 81/02343 | 8/1981 | WIPO . |
| WO 96/03164 | 2/1996 | WIPO . |
| WO 97/35930 | 10/1997 | WIPO . |
| WO 97/35941 | 10/1997 | WIPO . |

OTHER PUBLICATIONS

ACS Abstract JP 96301734; Date Nov. 19, 1996.
ACS Abstract JP 96236434; Date Sep. 13, 1996.
ACS Abstract JP 9201277; Date Jan. 6, 1992.
ACS Abstract JP 88285551; Date Nov. 22, 1988.
ACS Abstract JP 8827585; Date Feb. 5, 1988.
ACS Abstract JP 85133075; Date Jul. 16, 1985.
ACS Aabstract JP 83183094; Date Oct. 26, 1983.
ACS Abstract JP 79127978; Date Oct. 4, 1979.
ACS Abstract JP 7714269; Date Apr. 20, 1977.
ACS Abstract WO 9621167; Date Jul. 11, 1996.
ACS Abstract WO 8102343; Date Aug. 20, 1981.

Janney, Mark A. et al, "Development of low–toxicity gel–casting systems", J. Am. Ceram. Soc., 1998, vol. 81, No. 3., pp. 581–591.

Aihara, T. et al, "Development of vehicles for air–drying electrodeposition coatings", Adv. Org. Coat. Sci. Technol. Ser.; 1990, vol. 12, pp. 138–146.

Yoshii, Fumio et al, "Immobilization of erythrocytes by radiation polymerization of glass–forming monomers at low termperatures", Z. Naturforsch., C: Biosci, 1981, vol. 36C, No. 11–12, pp. 1062–1067.

Brauer, G. M. et al, Surface chemical modification of hard tissues: I. Bone; J. Dent. Res., 1977, vol. 56, No. 6, pp. 646–659.

*Primary Examiner*—Paul R. Michl
*Attorney, Agent, or Firm*—George D. Morris

[57] ABSTRACT

Water-soluble or water-dispersible addition copolymer of ethylenically unsaturated monomers, wherein the ethylenically unsaturated monomers comprise N-vinyl-2-pyrrolidinone and ethylenically unsaturated polyether, is useful as a component of inkjet printable coatings. The copolymer serves to reduce later migration of inks printed on the coatings.

27 Claims, No Drawings

WATER-SOLUBLE OR WATER-DISPERSIBLE ADDITION COPOLYMER

When substrates coated with an ink-receiving coating are printed with inkjet printing inks and dried, the inks often later migrate from their original locations on the coated substrate, thereby resulting in unsatisfactory images. Such migration is known as "bleed" or "bloom" and is especially prevalent under conditions of high temperature and high humidity such as for example, 35° C. an 80 percent relative humidity.

It has now been found that bleed can be substantially reduced or even eliminated if the coating contains organic polymer which is a copolymer of N-vinyl-2-pyrrolidinone [CAS 88-12-0] and ethylenically unsaturated polyether.

Accordingly, one embodiment of the invention is a water-soluble or water-dispersible addition copolymer of ethylenically unsaturated monomers, wherein the ethylenically unsaturated monomers comprise: (a) N-vinyl-2-pyrrolidinone; and (b) ethylenically unsaturated polyether represented by the formula:

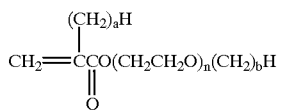

Formula (1)

wherein: (1) the average value of a is in the range of from 0 to 1; (2) the average value of b is in the range of from 0 to 2; and (3) the average value of n is in the range of from 1 to 30.

Another embodiment of the invention is an aqueous polymeric composition comprising: (a) a volatile aqueous medium; and (b) the above ethylenically unsaturated polyether represented by Formula (1) dissolved or dispersed in the aqueous medium.

In the case of the copolymer itself, it may be either water-soluble or water-dispersible, but preferably the copolymer is water-dispersible at ordinary room temperatures.

Similarly, in the case of the aqueous polymeric composition, the copolymer may be dissolved or dispersed in the volatile aqueous medium, but preferably the aqueous polymeric composition is a dispersion in which the copolymer is dispersed in the volatile aqueous medium.

The average value of a may be a whole or fractional number in the range of from 0 to 1. Preferably the average value of a is either 0 or 1.

The average value of b may be a whole or fractional number in the range of from 0 to 2. Often the average value of b is in the range of from 0 to 1. Preferably the average value of b is 1.

When the value of a is zero for any particular compound, the —$(CH_2)_a$H group is hydrogen. When the value of a is 1, the group is methyl. In an analogous manner, when the value of b is 0 for any particular compound, the —$(CH_2)_b$H group is hydrogen. When the value of b is 1 for any particular compound, the group is methyl. When the value of b is 2 for any particular compound, the group is ethyl. Although the values of a and b will each independently be a whole number for any particular compound, the average values of these quantities for mixtures of compounds may be whole or fractional numbers.

The values of a and b may be determined analytically or, as is most often the case, by a knowledge of the structures of the materials used to prepare the ethylenically unsaturated polyether.

The average value of n for the ethylenically unsaturated polyether is in the range of from 1 to 30. Typically it is in the range of from 1 to 20. In many cases it is in the range of from 3 to 17. Preferably the average value of n is in the range of from 6 to 12.

The value of n for any particular compound will be a positive integer, while the average value of n for a mixture of compounds constituting the ethylenically unsaturated polyether may be a positive integer or a positive number which is not an integer. In the case of a mixture, the value of n for an individual compound may be in the foregoing range or it may be above or below this range provided the average value for the mixture is within the range. When the average values of a and b are known, the average value of n for the ethylenically unsaturated polyether may be calculated from the number average molecular weight.

The number average molecular weight may be found experimentally or calculated from the distribution of individual compounds, if this is known, using the equalities:

$$\overline{M}_n = \frac{\sum M_k N_k}{\sum N_k} = \frac{\sum w_k}{\sum m_k}$$

where:
$\overline{M}_n$ is the number average molecular weight;
$M_k$ is the molecular weight of molecules of species k;
$N_k$ is the number of molecules of species k;
$w_k$ is the mass, expressed in grams, of molecules of species k; and
$m_k$ is the mass, expressed in gram-moles, of molecules of species k.

From a consideration of the permissible values of a and b, subclasses of compounds within the formula are:
poly(ethylene oxide) monoacrylate [CAS 26403-58-7]
poly(ethylene oxide) monomethacrylate [CAS 25736-86-1]
poly(ethylene oxide) methyl ether acrylate [CAS 32171-39-4]
poly(ethylene oxide) methyl ether methacrylate [CAS 26915-72-0]
poly(ethylene oxide) ethyl ether acrylate [CAS 35111-38-7]
poly(ethylene oxide) ethyl ether methacrylate [CAS 35625-93-5]

The proportions of N-vinyl-2-pyrrolidinone and ethylenically unsaturated polyether individually present in the ethylenically unsaturated monomers which are addition polymerized to form the addition copolymer may vary widely.

Usually N-vinyl-2-pyrrolidinone constitutes from 20 to 80 percent by weight of the ethylenically unsaturated monomers which are addition polymerized to form the addition copolymer. Frequently N-vinyl-2-pyrrolidinone constitutes from 30 to 70 percent by weight of the ethylenically unsaturated monomers which are addition polymerized. From 40 to 60 percent by weight is preferred.

Generally the ethylenically unsaturated polyether constitutes from 20 to 80 percent by weight of the ethylenically unsaturated monomers which are addition polymerized to form the addition copolymer. Frequently the ethylenically unsaturated polyether constitutes from 30 to 70 percent by weight of the ethylenically unsaturated monomers which are addition polymerized. From 40 to 60 percent by weight is preferred.

The proportions of N-vinyl-2-pyrrolidinone and ethylenically unsaturated polyether collectively present in the ethylenically unsaturated monomers which are addition polymerized to form the addition copolymer may vary considerably.

Ethylenically unsaturated monomers other than N-vinyl-2-pyrrolidinone and the ethylenically unsaturated polyether may optionally be present provided they do not preclude the copolymer from being water-soluble or water-dispersible. Examples of such optional monomers include: N-vinyl-1,3-dioxolane [CAS 3984-22-3] and N-vinylcaprolactam [CAS 2235-00-9].

The N-vinyl-2-pyrrolidinone and the ethylenically unsaturated polyether collectively usually constitute at least 90 percent by weight of the ethylenically unsaturated monomers which are addition polymerized to form the addition copolymer. Frequently the N-vinyl-2-pyrrolidinone and the ethylenically unsaturated polyether collectively constitute at least 95 percent by weight of the ethylenically unsaturated monomers which are addition polymerized. Often the N-vinyl-2-pyrrolidinone and the ethylenically unsaturated polyether collectively constitute at least 98 percent by weight of the ethylenically unsaturated monomers which are addition polymerized. Preferably the ethylenically unsaturated monomers which are addition polymerized consist of the N-vinyl-2-pyrrolidinone and the ethylenically unsaturated polyether; that is, the N-vinyl-2-pyrrolidinone and the ethylenically unsaturated polyether collectively constitute substantially 100 percent by weight of the ethylenically unsaturated monomers which are addition polymerized.

The water-soluble or water-dispersible addition copolymer of the invention may be made by solution polymerization in a water-isopropanol solvent initiated by 2,2'-azobis(2-methylbutanenitrile) [CAS 13472-08-7]. The polymerization is conducted at temperatures in the range of from 75° C. to 80° C. for about 5 hours, followed by removal of the isopropanol-water azeotrope under reduced pressure until the isopropanol content of the composition is less than about 1 percent by weight.

The aqueous polymeric composition may be formed by dissolving or dispersing the copolymer of the invention in an aqueous medium, usually with agitation. Moderate heating is sometimes used to assist dissolution or dispersion formation.

The aqueous polymeric composition can be in the form of an aqueous solution in which case the volatile aqueous liquid medium is a volatile aqueous solvent for the film-forming organic polymer, or the aqueous polymeric composition can be in the form of an aqueous dispersion in which instance the volatile aqueous liquid medium is a volatile aqueous dispersion liquid for at least some of the film-forming organic polymer.

The volatile aqueous liquid medium is predominately water. Small amounts of low boiling volatile water-miscible organic liquids may be intentionally added for particular purposes. Examples of such low boiling volatile water-miscible organic liquids solvents include methanol [CAS 67-56-1], ethanol [CAS 64-17-5], 1-propanol, [CAS 71-23-8], 2-propanol [CAS 67-63-0], 2-butanol [CAS 78-92-2], 2-methyl-2-propanol [CAS 75-65-0], 2-propanone [CAS 67-64-1], and 2-butanone [CAS 78-93-3]. The listing of such liquids is by no means exhaustive.

It is preferred that substantially no low boiling volatile water-miscible organic liquids be intentionally added to the system in order to minimize organic emissions upon drying the coating.

Similarly, water-miscible organic liquids which themselves are of low, moderate, or even negligible volatility may be intentionally added for particular purposes, such as for example, retardation of evaporation. Examples of such organic liquids include 2-methyl-1-propanol [CAS 78-83-1], 1-butanol [CAS 71-36-3], 1,2-ethanediol [CAS 107-21-1], and 1,2,3-propanetriol [CAS 56-81-5]. The listing of such liquids is by no means exhaustive.

It is preferred that substantially no water-miscible organic liquids which are of low, moderate, or negligible volatility be intentionally added to the system.

Notwithstanding the above, those materials which, although not intentionally added for any particular purpose, are normally present as impurities in one or more of the components of the aqueous polymeric compositions of the invention and which become components of the volatile aqueous liquid medium, may be present at low concentrations.

In most instances water constitutes at least 95 percent by weight of the volatile aqueous liquid medium. Often water constitutes at least 99 percent by weight of the volatile aqueous liquid medium. Preferably water constitutes substantially all of the volatile aqueous liquid medium.

The amount of volatile aqueous liquid medium present in the aqueous polymeric composition may vary widely. Usually, however, the volatile aqueous liquid medium constitutes from 40 to 90 percent by weight of the aqueous polymeric composition. Often the volatile aqueous liquid medium constitutes from 50 to 80 percent by weight of the aqueous polymeric composition. Preferably the volatile aqueous liquid medium constitutes from 70 to 80 percent by weight of the aqueous polymeric composition.

The amount of copolymer dissolved or dispersed in the aqueous medium may be varied very widely. Usually the copolymer of the invention constitutes from 10 to 60 percent by weight of the aqueous polymeric composition. Often the copolymer constitutes from 20 to 50 percent by weight of the aqueous polymeric composition. From 20 to 30 weight percent is preferred.

The addition copolymer of the present invention may be included in many water-based coating compositions used to form coatings which are receptive of inkjet printing inks. In most instances the addition copolymer of the invention constitutes from 1 to 40 percent by weight of the organic binder of the coating composition or of a coating formed from the coating composition.

The invention is further described in conjunction with the following examples which are to be considered illustrative rather than limiting, and in which all parts are parts by weight and all percentages are percentages by weight unless otherwise specified.

EXAMPLE 1

An initiator solution was prepared by heating a mixture of 200 grams of 30/70 aqueous isopropanol solvent (30 percent water and 70 percent isopropanol, by weight) and 5 grams 2,2'-azobis(2-methylbutanenitrile) to 75° C. with stirring.

A monomer solution was formed by admixing 50 grams of N-vinyl-2-pyrrolidinone, 50 grams of ethylenically unsaturated polyether represented by Formula (1) wherein a=1, b=1, and n=12 (Sartomer CD 522; Sartomer Company, Inc., West Chester, Pa., USA), and 100 grams of 30/70 aqueous isopropanol solvent.

A reaction mixture was formed by adding the monomer solution to the initiator solution over a period of 3 hours at a temperature of 75° C. About 30 grams of additional 30/70 aqueous isopropanol solvent was used to rinse the residual monomer solution from its container into the reaction mixture. The reaction mixture was heated to 80° C. over a period of 10 minutes and then held at that temperature for 3 hours. Heating was discontinued and the reaction mixture was stirred overnight. The resulting reaction mixture weighed 429 grams.

Using a rotary evaporator and under the vacuum provided by a water aspirator, solvent was removed from the reaction mixture at from 40° C. to 50° C. until no further distillate was produced and then the vacuum was broken. The distillate removed weighed 275 grams. Since no trap was used for the vacuum distillation, some isopropanol may have been lost. The residue was a viscous liquid containing product polymer. The addition of 155 grams of water caused dissolution of the product polymer solids. The resulting copolymer solution weighed 292 grams and had a solids content of 25 percent by weight.

EXAMPLE 2

An initiator solution was prepared by heating a mixture of 200 grams of 30/70 aqueous isopropanol solvent and 5 grams 2,2'-azobis(2-methylbutanenitrile) to 75° C. with stirring.

A monomer solution was formed by admixing 50 grams of N-vinyl-2-pyrrolidinone, 50 grams of ethylenically unsaturated polyether represented by Formula (1) wherein a=1, b=0, and n=6 (Catalog No. 40,953-7; Aldrich Chemical Company, Inc., Milwaukee, Wis., USA), and 150 grams of deionized water.

A reaction mixture was formed by adding the monomer solution to the initiator solution over a period of 3 hours at a temperature of 75° C. About 50 grams of deionized water was used to rinse the residual monomer solution from its container into the reaction mixture. The reaction mixture was heated to 80° C. over a period of 10 minutes and then stirred at this temperature overnight. The resulting reaction mixture weighed 493 grams.

Using a rotary evaporator and under the vacuum provided by a water aspirator, solvent was removed from the reaction mixture at 40° C. until no further distillate was produced and then the vacuum was broken. The distillate removed weighed 151 grams. Since no trap was used for the vacuum distillation, some isopropanol may have been lost. The residue was a clear liquid solution when hot. Upon standing overnight at room temperature, the solution became a light brown, cloudy composition. The light brown cloudy composition weighed 339 grams and had a solids content of 29.9 percent by weight. The light brown, cloudy composition was filtered through a cloth having 50-micrometer openings. The filtrate was a clear copolymer solution.

EXAMPLE 3

A 6 percent aqueous poly(ethylene oxide) solution consisted essentially of 94 parts by weight water in which were dissolved 6 parts by weight poly(ethylene oxide) having a weight average molecular weight in the range of from 300,000 to 450,000.

A pseudoboehmite dispersion was formed by gradually adding 140 grams of Condea Disperal® P2 pseudoboehmite powder (RWE-DEA Aktiengesellschaft, Brunsbüttel, Germany) to 860 grams of 0.25% aqueous nitric acid and stirring the mixture until a translucent pseudoboehmite dispersion was obtained.

The charges shown in Table 1 were used in the preparation of an aqueous secondary ammonium cationic polymer composition.

TABLE 1

| Ingredients | Weight, kilograms |
|---|---|
| Charge 1-1 | |
| Methyl ethyl ketone | 55.93 |
| Charge 1-2 | |
| Methyl ethyl ketone | 28.67 |
| Initiator[1] | 10.16 |
| Charge 1-3 | |
| n-Butyl acrylate | 30.44 |
| Methyl methacrylate | 87.32 |
| 2-(tert-Butylamino)ethyl methacrylate [CAS 3775-90-4] | 40.64 |
| Styrene | 44.68 |
| Charge 1-4 | |
| Methyl ethyl ketone | 2.27 |
| Charge 1-5 | |
| Methyl ethyl ketone | 2.27 |
| Charge 1-6 | |
| Glacial acetic acid | 9.89 |
| Methyl ethyl ketone | 2.27 |
| Charge 1-7 | |
| Deionized water | 579.1 |
| Charge 1-8 | |
| Deionized water | 11.1 |

[1]VAZO ® 67 2,2'-Azobis(2-methylbutanenitrile) initiator, E. I. du Pont de Nemours and Company, Wilmington, Delaware.

Charge 1-1 was heated in a reactor with agitation to reflux temperature (80° C.). The addition of Charge 1-2 from a catalyst tank to the reactor was then begun. The addition of Charge 1-2 was made over a period of 305 minutes. Five minutes after beginning the addition of Charge 1-2, the addition of Charge 1-3 from a monomer tank was begun. The addition of Charge 1-3 was made over a period of 240 minutes. When the addition of Charge 1-3 was completed, Charge 1-4 was added to the monomer tank as a rinse and then the rinse liquid was added from the monomer tank to the reactor over a period of 10 minutes. Upon completion of the addition of Charge 1-2, Charge 1-5 was added to the catalyst tank as a rinse and then the rinse liquid was added from the catalyst tank to the reactor over a period of 10 minutes. The reaction mixture was then agitated at reflux for three hours while the temperature of the reaction mixture was in the range of from 83° C. to 86° C. At the end of the three hour period, the reaction mixture was cooled to temperatures in the range of from 48° C. to 52° C. Charge 1-6 was added over a period of 10 minutes and the reaction mixture was thereafter agitated for 15 minutes. Charge 1-7 was added to a thinning tank equipped for distillation and heated to temperatures in the range of from 48° C. to 52° C. The reaction mixture was dropped from the reactor to the thinning tank as quickly as possible. Charge 1-8 was added to the reactor as a rinse and then the rinse liquid was also dropped to the thinning tank. The contents of the thinning tank were agitated for 30 minutes at temperatures in the range of from 48° C. to 52° C. Over a thirty minute period the pressure was reduced to 71.3 kilopascals, absolute. The temperature was then increased and liquid was stripped off under vacuum until the solids content of the batch was about 30 percent by weight. The resulting product which was an aqueous secondary ammonium cationic polymer composition, was cooled to about 48° C., filtered, and then discharged into drums.

The charges shown in Table 2 were used in the preparation of an aqueous quaternary ammonium cationic polymer composition.

TABLE 2

| Ingredients | Weight, grams |
|---|---|
| Charge 2-1 | |
| Deionized water | 100.0 |
| Aqueous isopropanol[1] | 200.0 |
| Initiator[2] | 5.0 |
| Charge 2-2 | |
| Methyl methacrylate | 20.0 |
| Styrene | 20.0 |
| n-Butyl acrylate | 15.0 |
| Aqueous quaternary monomer[3] | 56.3 |
| Aqueous isopropanol[1] | 150.0 |

[1] 70% isopropanol, 30% water, by weight.
[2] VAZO ® 67 2,2'-Azobis(2-methylbutanenitrile) initiator, E. I. du Pont de Nemours and Company, Wilmington, Delaware.
[3] 80% [2-(methacryloyloxy)ethyl]trimethyl ammonium methylsulfate, 20% water, by weight.

Charge 2-1 was heated to 75° C. Charge 2-2 was introduced to Charge 2-1 at 75° C. over a period of 3 hours. The reaction mixture was then stirred for 5 hours at 80° C. The isopropanol was removed by stripping on a Rotovapor® rotary evaporator at 60° C. Water was added to provide an aqueous quaternary ammonium cationic polymer composition having a solids content of 25.5% by weight.

To a plastic container was added 200 grams of the above 6 percent aqueous poly(ethylene oxide) solution. With stirring, there were added to the aqueous poly(ethylene oxide) solution 60 grams of the above pseudoboehmite dispersion, 24 grams of the above aqueous secondary ammonium cationic polymer composition, 25 grams of the above aqueous quaternary ammonium cationic polymer composition, and 38.9 grams of the copolymer solution of Example 1. The mixture was stirred for 30 minutes to form a coating composition.

A portion of the coating composition was drawn down on Glory Base photograde basestock paper (Felix Schoeller Jr. GmbH & Co. KG, Osnabrük, Germany) using a Meyer Rod #160. The wet coating was dried in an oven at 105° C. for 3.5 minutes to form a coated substrate.

Although the present invention has been described with reference to specific details of certain embodiments thereof, it is not intended that such details should be regarded as limitations upon the scope of the invention except insofar as they are included in the accompanying claims.

We claim:

1. A water-soluble or water-dispersible addition copolymer of ethylenically unsaturated monomers, wherein the ethylenically unsaturated monomers comprise:

(a) N-vinyl-2-pyrrolidinone; and (b) ethylenically unsaturated polyether represented by the formula:

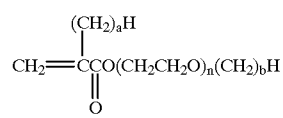

wherein:

(1) the average value of a is in the range of from 0 to 1;

(2) the average value of b is in the range of from 0 to 2; and (3) the average value of n is in the range of from 1 to 30.

2. The water-soluble or water-dispersible addition copolymer of claim 1 wherein the average value of a is 0.

3. The water-soluble or water-dispersible addition copolymer of claim 1 wherein the average value of a is 1.

4. The water-soluble or water-dispersible addition copolymer of claim 1 wherein the average value of b is in the range of from 0 to 1.

5. The water-soluble or water-dispersible addition copolymer of claim 1 wherein the average value of b is 1.

6. The water-soluble or water-dispersible addition copolymer of claim 1 wherein the average value of n is in the range of from 1 to 20.

7. The water-soluble or water-dispersible addition copolymer of claim 1 wherein the average value of n is in the range of from 3 to 17.

8. The water-soluble or water-dispersible addition copolymer of claim 1 wherein the average value of n is in the range of from 6 to 12.

9. The water-soluble or water-dispersible addition copolymer of claim 1 wherein:

(a) the N-vinyl-2-pyrrolidinone constitutes from 20 to 80 percent by weight of the ethylenically unsaturated monomers which are addition polymerized to form the addition copolymer; and (b) the ethylenically unsaturated polyether constitutes from 20 to 80 percent by weight of the ethylenically unsaturated monomers which are addition polymerized to form the addition copolymer.

10. The water-soluble or water-dispersible addition copolymer of claim 1 wherein the N-vinyl- 2-pyrrolidinone and the ethylenically unsaturated polyether collectively constitute at least 90 percent by weight of the ethylenically unsaturated monomers which are addition polymerized to form the addition copolymer.

11. The water-soluble or water-dispersible addition copolymer of claim 1 wherein the N-vinyl-2-pyrrolidinone and the ethylenically unsaturated polyether collectively constitute substantially 100 percent by weight of the ethylenically unsaturated monomers which are addition polymerized to form the addition copolymer.

12. An aqueous polymeric composition comprising:

(a) a volatile aqueous medium; and (b) addition copolymer of ethylenically unsaturated monomers dissolved or dispersed in the volatile aqueous medium;

wherein the addition copolymer of ethylenically unsaturated monomers comprises:

(c) N-vinyl-2-pyrrolidinone; and (d) ethylenically unsaturated polyether represented by the formula:

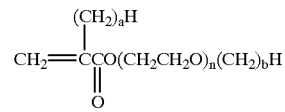

wherein:

(1) the average value of a is in the range of from 0 to 1;

(2) the average value of b is in the range of from 0 to 2; and (3) the average value of n is in the range of from 1 to 30.

13. The aqueous polymeric composition of claim 12 wherein the addition copolymer of ethylenically unsaturated monomers is dispersed in the volatile aqueous medium.

14. The aqueous polymeric composition of claim 12 wherein water constitutes at least 95 percent by weight of the volatile aqueous liquid medium.

15. The aqueous polymeric composition of claim 12 wherein water constitutes substantially all of the volatile aqueous liquid medium.

16. The aqueous polymeric composition of claim 12 wherein the volatile aqueous liquid medium constitutes from 40 to 90 percent by weight of the aqueous polymeric composition.

17. The aqueous polymeric composition of claim 12 wherein the addition copolymer constitutes from 10 to 60 percent by weight of the aqueous polymeric composition.

18. The aqueous polymeric composition of claim 12 wherein the average value of a is 0.

19. The aqueous polymeric composition of claim 12 wherein the average value of a is 1.

20. The aqueous polymeric composition of claim 12 wherein the average value of b is in the range of from 0 to 1.

21. The aqueous polymeric composition of claim 12 wherein the average value of b is 1.

22. The aqueous polymeric composition of claim 12 wherein the average value of n is in the range of from 1 to 20.

23. The aqueous polymeric composition of claim 12 wherein the average value of n is in the range of from 3 to 17.

24. The aqueous polymeric composition of claim 12 wherein the average value of n is in the range of from 6 to 12.

25. The aqueous polymeric composition of claim 12 wherein:
   (a) the N-vinyl-2-pyrrolidinone constitutes from 20 to 80 percent by weight of the ethylenically unsaturated monomers which are addition polymerized to form the addition copolymer; and
   (b) the ethylenically unsaturated polyether constitutes from 20 to 80 percent by weight of the ethylenically unsaturated monomers which are addition polymerized to form the addition copolymer.

26. The aqueous polymeric composition of claim 12 wherein the N-vinyl-2-pyrrolidinone and the ethylenically unsaturated polyether collectively constitute at least 90 percent by weight of the ethylenically unsaturated monomers which are addition polymerized to form the addition copolymer.

27. The aqueous polymeric composition of claim 12 wherein the N-vinyl-2-pyrrolidinone and the ethylenically unsaturated polyether collectively constitute substantially 100 percent by weight of the ethylenically unsaturated monomers which are addition polymerized to form the addition copolymer.

* * * * *